United States Patent [19]

Hare

[11] 4,223,619
[45] Sep. 23, 1980

[54] BAKING PAN AND METHOD OF FORMING SAME

[75] Inventor: Wilbert K. Hare, Lemont, Ill.

[73] Assignee: American Home Products Corporation, New York, N.Y.

[21] Appl. No.: 28,002

[22] Filed: Apr. 9, 1979

Related U.S. Application Data

[62] Division of Ser. No. 810,119, Jun. 27, 1977, Pat. No. 4,167,233.

[51] Int. Cl.³ .............................................. B21D 51/18
[52] U.S. Cl. ........................... 113/120 G; 113/120 E; 113/120 V; 228/196
[58] Field of Search ....... 113/116 W, 120 CC, 120 E, 113/120 G, 120 M, 120 V; 228/125, 173 C, 196; 219/154; 220/72, 74, 75

[56] References Cited

U.S. PATENT DOCUMENTS

| 2,237,535 | 4/1941 | Wahl | 228/173 C |
| 3,245,143 | 4/1966 | Chopinet et al. | 228/196 |
| 3,265,022 | 8/1966 | Kaufman | 113/120 E |

Primary Examiner—Lowell A. Larson
Attorney, Agent, or Firm—Robert D. Teichert

[57] ABSTRACT

A baking pan comprising a bottom wall and side walls formed from a single blank of sheet metal having smooth inner and outer wall surfaces and providing corners connecting the adjacent side walls which are substantially thicker than the side walls. The terminal portions of the side walls remote from the bottom wall having flange portions formed to impart rigidity to the pan and provide securement means to other pans when positioned in a side-by-side relationship. A circumferential band encompassing multiple pans in a side-by-side relationship to complete the assembly of pans.

5 Claims, 22 Drawing Figures 4,223,619

BAKING PAN AND METHOD OF FORMING SAME

This is a division of application Ser. No. 810,119 filed June 27, 1977, now U.S. Pat. No. 4,167,233 granted Sept. 11, 1979.

BACKGROUND OF THE INVENTION

This invention relates to baking pans and more particularly to such pans as are used in commercial establishments for baking bread or similar bakery products, and wherein said pans are usually secured in a side-by-side relationship to provide a pan set for baking a multiplicity of baked products at one time.

While many characteristics of a baking pan would be the same whether such pan was to be used in the home or in a commercial bakery, there are certain production techniques and health regulations involved in commercial establishments that require structural criteria for a commercial baking pan that is not necessary in a home use baking pan. Such structural criteria would include, among other things, sufficient mechanical strength and stability to withstand the abuses of continual and repeated handling, both by hand and by automatic equipment, as well as the elimination or minimization of seams, abutments, projections and other configurations in pan structure where baking residue can collect and which resists removal in washing.

As to mechanical strength and stability, this normally involves increasing pan corner strength sufficiently to maintain structural integrity in spite of abuses attending stacking, conveying, de-panning and other such production line operations, and also includes providing suitable securement means of a set of pans, one-to-the-others, sufficient to maintain the integrity of the entire pan set in withstanding the abuses of the production equipment. Such mechanical strength and stability must be achieved while making the pan sets as lightweight as possible, thereby providing for easier handling, minimizing pan heat-up and baking time, and reducing the material cost of the pans.

As to the sanitation aspects of commercial baking pans, it is not sufficient that the baking surface of the pan be readily cleanable but also that it be maintained clean between bakes. This requires that not only must the interior of the pan be free of soil holding configurations, but also that the exterior of the pan which is nested within that pan be free of said holding configurations. It is clear that when pans or pan sets are stacked and stored between bakes that the nesting of pans within pans offers the opportunity for contamination of a pan interior by dislodging residue from the exterior surface of the adjacent overlying pan.

The commercial need for adequate pan corner strength and suitable inside-outside pan sanitation features has not been adequately met by pan suppliers. While baking pan construction has been modified to attempt to solve these problems the modifications have usually resulted in extremely high pan cost, impaired baking characteristics, or structures not suited to the abuse of automatic production equipment.

Accordingly, it is the primary object of this invention to overcome these disadvantages as well as provide a baking pan having the advantages before described.

SUMMARY OF THE INVENTION

This invention contemplates the provision of a baking pan formed from a single blank of sheet metal or the like wherein separated side walls having terminal flange portions extend upwardly from a bottom wall to lie in planes substantially normal to said bottom wall, with the flange portions of adjacent side walls being positioned in an abutting relationship. A laser beam of known power suitably shielded, and with a predetermined beam position and impingement angle relative to the side wall abutting flanges, moves the length of said abutting flanges at a certain travel speed thereby fusing the abutting flanges to form a corner connection between adjacent side walls. Said corner connection is substantially thicker than the side walls and extends outwardly beyond the adjacent side wall outer surfaces. Suitable pressure applied uniformly to the outer surface of the corner connection reforms said corner to an elliptical cross-section configuration, characterized as having a smooth, regular surface both on the inside and outside portions of the corner which blend into the side wall surfaces.

The side wall flange portions remote from the pan bottom wall are designed to provide means for rigidifying the terminal portion of the side walls and for securing multiple pans in a side-by-side relationship. Rigidification is accomplished by folding said remote flange portion into intimate contact with the outer surface of the side wall from which it is formed. Securement of multiple pans in a side-by-side relationship is accomplished by encircling the peripheral portion of the pan set (multiple pans in a side-by-side relationship) with a strapping member which is welded, or otherwise secured, to the remote flanges of the side walls which lie on the periphery of the pan set; additional securement of multiple pans in a side-by-side relationship is achieved by securing one-to-the-other the remote flanges of the side walls of adjacent pans, which remote flanges are not on the peripheral portion of the pan set, and for this purpose such remote flanges are designed to provide an extended portion which abut one another to permit a laser fusion there between.

DESCRIPTION OF THE PREFERRED EMBODIMENTS

Figure 1:
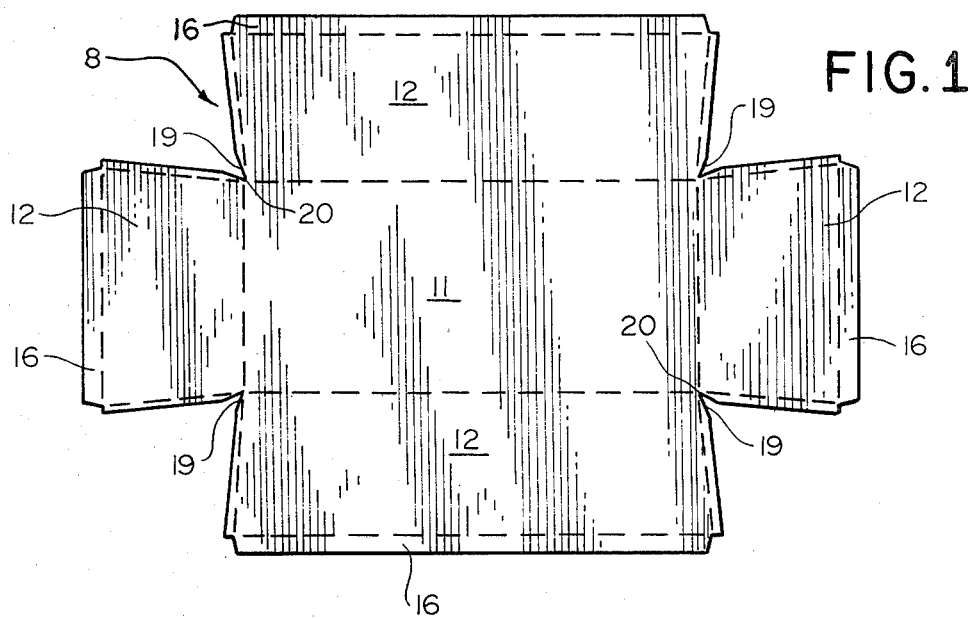
FIG. 1 is a plan view of a sheet metal blank for production of a baking pan in accordance with this invention, while said blank is in a flat state.

Referring to the drawings, FIG. 1 shows a blank of sheet metal of suitable contour for forming a baking pan in accordance with this invention. As initial steps in the transformation of the blank in accordance with the process of this invention, the blank 8 is bent along fold lines indicated by dotted lines in FIG. 1 to produce a pan 10 having a flat bottom wall 11 and upwardly bent side walls 12 as shown in FIG. 3.

Each of the side walls 12 has formed at the terminal portions thereof corner flanges 15 and top flanges 16. Said corner flanges 15 and top flanges 16 of said side walls 12 are bent along the fold lines indicated in FIG. 1 in a manner to be disposed on the outside of the formed baking pan 10 as illustrated in FIG. 3. As shown in FIG. 3, and with reference to FIG. 5, the corner flanges 15 are folded outwardly at an angle such that when the side walls 12 are positioned in a plane substantially normal to the bottom wall 11, the adjacent corner flanges of adjacent side walls are in abutment one with another. Also, as shown in FIG. 3, but with reference to FIG. 4, the top flanges 16 are folded outwardly and to such a degree that they are in abutting contact with the outer surface 18 of the side wall 12 from which said top flange is formed. The folding of the top flange in this manner not only provides a smooth, closed surface at the open portion of the pan, it offers a double thickness of material at the upper terminal portion of the side wall, providing suitable lateral strength to assure the rigidity of the side wall.

Figure 2:
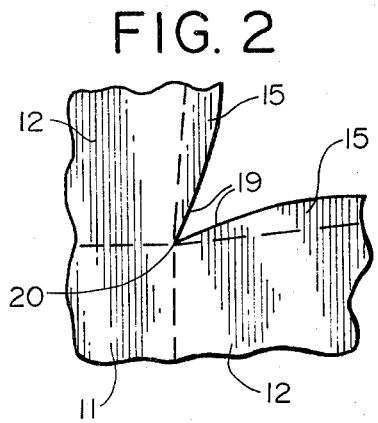
FIG. 2 is an enlarged fragmentary view of a portion of the sheet metal blank of FIG. 1.
Figure 3:
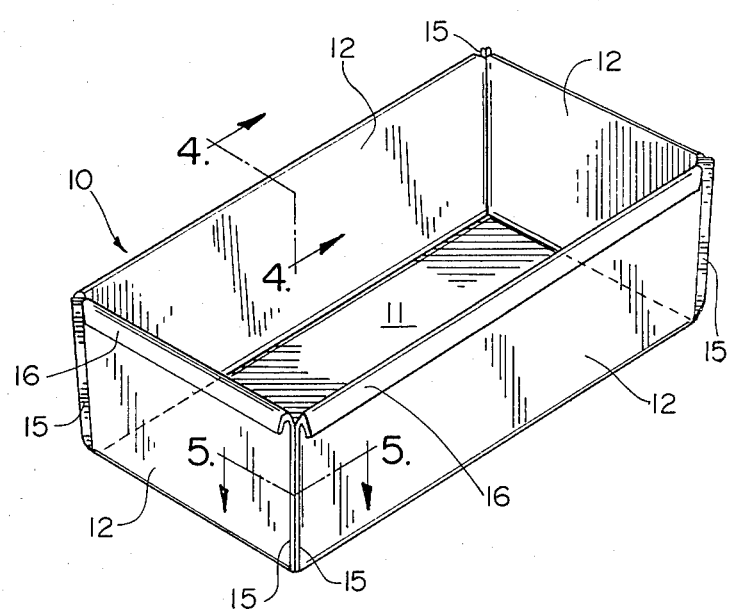
FIG. 3 is a perspective view of the blank shown in FIG. 1 illustrating the same as a partially completed pan and showing the disposition of portions subsequent to folding to form a bottom wall and side walls but prior to securement of said walls to complete the pan.
Figure 4:
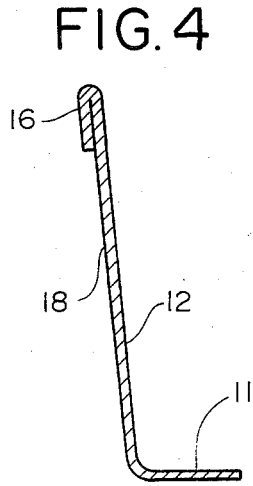
FIG. 4 is an enlarged sectional view taken along lines 4—4 of FIG. 3.

As shown in FIG. 1, the fold lines for the corner flanges 15 of each side wall 12 diverge outwardly from the bottom wall 11 so that the formed pan, as shown in FIG. 3, will have side walls that taper outwardly upwardly. Such tapered side walls are customary in the art to provide nesting of like pans one with another. Also, and with reference to FIG. 2, it should be noted that the corner flanges 15 are angle cut as indicated by reference numeral 19 in a manner to produce a point of intersection 20 between adjacent side walls and the bottom wall that is marked by the absence of abutting corner flange material, the purpose of which will be described later.

Figure 5:
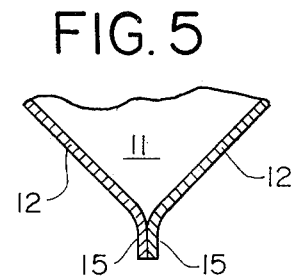
FIG. 5 is an enlarged sectional view taken along lines 5—5 of FIG. 3.

With the blank of sheet metal 8 of FIG. 1 folded as described to produce the partially completed pan 10 as illustrated in FIG. 3, the corner flanges 15 of adjacent side walls 12 will be in abutting position as shown in FIG. 5. For the purpose of now fusing and reforming adjacent corner flanges to permanently connect adjacent side walls it is necessary that intimate contact between abutting corner flanges be maintained. For this purpose, and not a part of this invention, any suitable jig arrangement or holding device may be employed which will secure the pan in the condition illustrated in FIG. 3 in a manner to permit relative movement between said pan and a device which will act upon the abutting corner flanges to fuse said flanges and reform said flanges.

Figure 6:
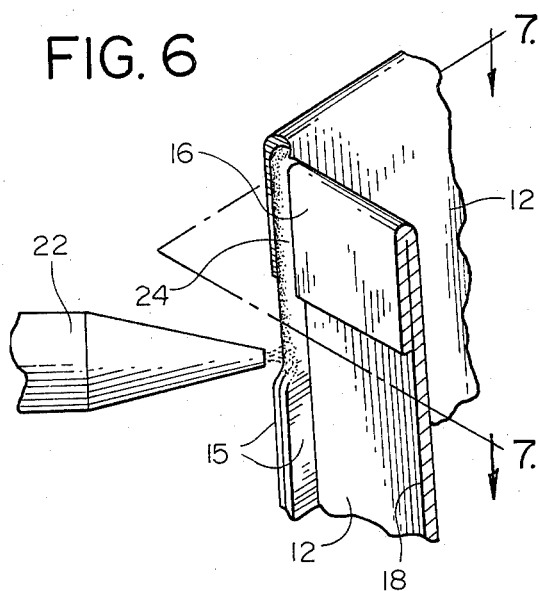
FIG. 6 is an enlarged fragmentary perspective view of the pan as illustrated in FIG. 3 showing adjacent side walls and the means for fusing one side wall to the other.

Such a device for fusing abutting corner flanges is shown in FIG. 6 and identified by reference numeral 22 as a laser gun. The operation of a laser gun and the characteristics of a laser beam are known in the art, and as such do not form part of this invention. However, such general knowledge does not teach how and under what conditions a laser technique can be utilized in combination with a specific configuration of metal to produce a particular pan having particular structural qualities and performance characteristics.

Figure 7:
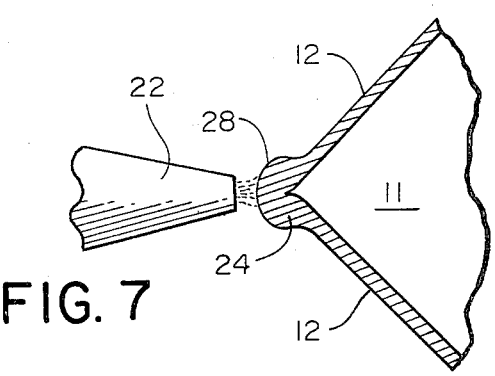
FIG. 7 is a sectional view taken along lines 7—7 of FIG. 6.

In this respect, and for the purpose of describing this invention, it is sufficient to define the device for fusing abutting corner flanges as a laser beam of an established power, suitably shielded, having a predetermined beam position and impingement angle relative to the abutting flanges, which traverses the length of said abutting flanges at a given travel speed thereby fusing the abutting flanges to provide a corner connection between adjacent side walls. This step in the process of this invention is illustrated in FIGS. 6 and 7 and produces a corner connection 24 which projects outwardly of the pan side walls 12 and is substantially thicker than the side walls.

Figure 8:
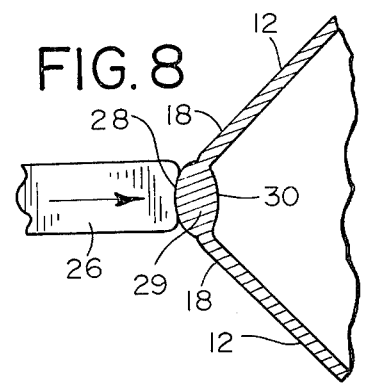
FIG. 8 is a sectional view similar to FIG. 7 but showing means for reforming the fused connection between the pan side walls.

As shown in FIG. 8, a reforming device 26 applies pressure to the outer surface 28 of the corner connection 24 of sufficient force to reform said corner connection into a corner post 29 of elliptical configuration, as shown. Such reformation of the corner connection upsets the material mass in a manner so that the outer surface 28 and the inner surface 30 of the resulting corner post 29 are of similar contour, both being characterized as smooth, uniform surfaces which blend into the adjacent side walls. Such reforming of the corner connection 24 is designed to dispose the outer surface 28 of the resulting corner post 29 within the planes of the outer surfaces 18 of the side walls 12.

It is of importance to note that the fusing of the abutting corner flanges 15 to provide the corner connection 24, and the reforming of said corner connection to provide the elliptically shaped corner post 29, combine to produce a corner post which is substantially thicker than the adjacent side walls 12, and accordingly stronger than said side walls. Thus pan corner strength is achieved without losing the savings in material costs and baking efficiencies occasioned by relatively thin pan wall construction.

Figure 9:
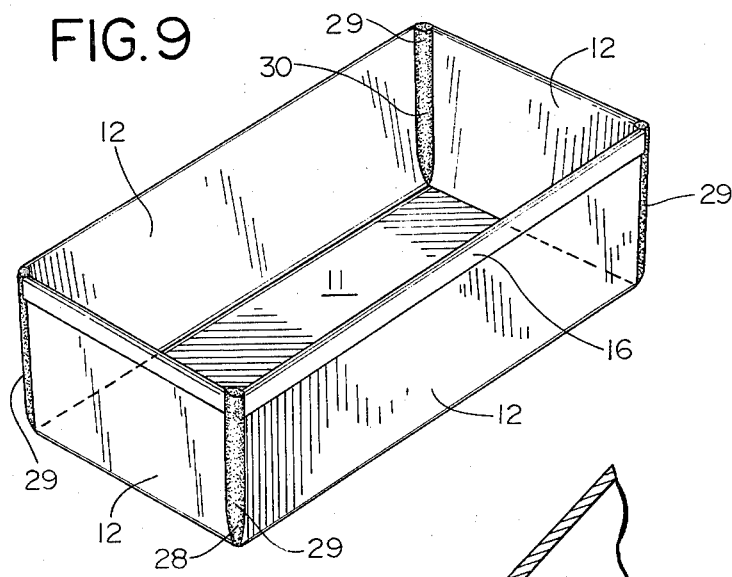
FIG. 9 is a perspective view of a completed baking pan produced in accordance with this invention.

As illustrated in FIG. 9, a completed baking pan produced in accordance with this invention has corner posts 29 which connect adjacent side walls 12, said corner posts being substantially thicker than said side walls and thereby providing corner strength in excess of the side wall strength. It should be noted that the corner posts formed in accordance with the teachings of this invention provide a columnar mass of material of substantial thickness confined to the point of intersection of the side walls. Such confination is possible since formation of the corner connection is accomplished on the outside of the point of intersection of the side walls and by subsequent reforming positioned within the point of intersection of said side walls. It should also be noted that the thickness of the corner connection, and thus the corner post, is determined by the lateral length of the corner flanges 15.

Figure 10:
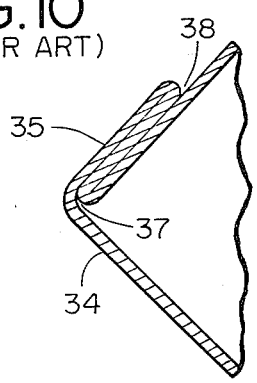
FIG. 10 is a sectional view of a corner portion of a folded-end baking pan known in the prior art.

The importance of the corner post construction as thus described can be best appreciated by review of the prior art. With reference to FIG. 10 there is a corner section of the well-known folded-end baking pan 34, which to this date is the most popular form of baking pan construction utilized. The folding technique used in producing this type of pan assures a "leak-proof" construction and the multiple folds 35 on the side wall adjacent a corner provides a great side wall strength. Unfortunately, this style of fabrication does not position the thickened wall formation at the point of intersection of the side walls where the added strength is most needed, and by the nature of its assembly the folds provide inside crevices 37 and outside crevices 38 where soil and baking residue can collect.

Figure 11:
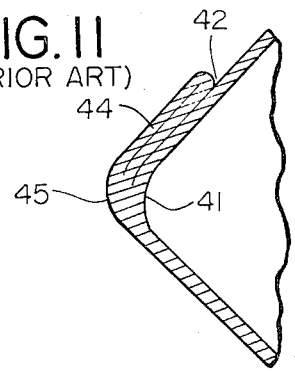
FIG. 11 is a sectional view similar to FIG. 10 but showing fusion of a portion of the corner as also known in the prior art.

As shown in FIG. 11, a folded-end baking pan can be modified to partially overcome these disadvantages by fusing portions of the multifolded metal in the area of the point of intersection of the side walls, as indicated at reference numeral 40. Such construction is shown in detail in U.S. Pat. No. 3,219,229. As shown, such structure provides a smooth interior corner portion 41 but does not eliminate the exterior crevice 42, which crevice can entrap contaminants which when the baking pans are nested one-in-another can be dislodged to fall within an underlying pan. Also, while the fusing and reforming of the multi-folds of metal as at 40 does provide greater corner strength there is a substantial excess of folded material, indicated at 44, which is not only costly but unnecessarily increases the pan weight and affects the baking characteristics of the pan.

Another improvement in the prior art, directed primarily to sanitation, was the introduction of the "drawn" pan. Drawing metal from a flat blank to form a pan with uninterrupted side walls is a well established process not necessary to describe. It is sufficient to note that a drawn pan does provide a leak-proof structure which smooth inner and outer surfaces, which surfaces are free from irregularities or other projections which could provide means for said collection and pan contamination. However, a drawn pan has a uniform side wall thickness and does not, in itself, provide thickened corner construction. Thus, while a drawn pan is well suited for home use it is not suitable for the abuse of commercial baking operations. In this respect, if the metal thickness is such to provide pan corners of sufficient strength to withstand commercial handling the side walls are unnecessarily thick.

Figure 12:
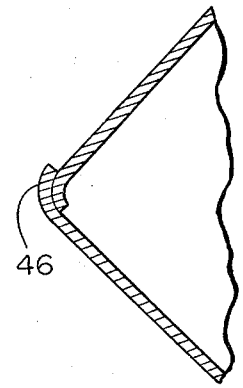
FIG. 12 is a sectional view of a corner portion of a baking pan construction known in the prior art wherein the corner portion is formed by overlap of the adjacent side walls.
Figure 13:
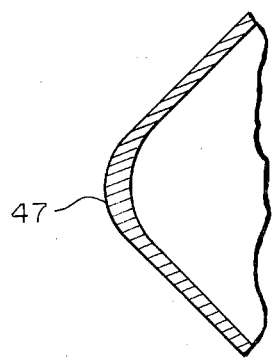
FIG. 13 is a sectional view similar to FIG. 12 but showing the corner portion with the overlapped portions of the side walls fused or welded.

With reference to FIG. 12, there is shown the corner section of a baking pan of current production techniques in which the pan side walls have flange portions 46 which overlap, and which, when subjected to a suitable fusing and forming process can produce a corner construction as indicated by reference numeral 47 in FIG. 13. This construction, while providing smooth interior and exterior surfaces has inherent limitations in providing adequate corner thickness and strength. Obviously, lengthening the flanges to increase the amount of metal in the overlap, also increases the lateral span of the overlap, and under known fusing and forming techniques it would not be possible to confine the thick metal mass to the point of intersection of the side walls, at least for mass production purposes. Likewise, thickening the side walls only in the flange areas to provide more mass with a small lateral overlap is not practical since pan blanks are production line produced from flat stock of uniform thickness.

It should be clear that this invention teaches a pan forming process heretofore not practiced in the art of pan-making and produces a pan that incorporates the advantages of the pans known in the prior art while eliminating the disadvantages contained in the prior art pan constructions.

With reference back to FIG. 2, there is shown an angle cut 19 on the corner flanges 15 adjacent the point of intersection 20 between the adjacent side walls 12 and the bottom wall 11. This reduction of flange material accommodates the slight "droop" or "overrun" of fused metal during the flange fusing process and permits reforming of the corner connection without distortion of the bottom wall and without producing a projection of the corner post below the plane of the bottom wall.

Figure 14:
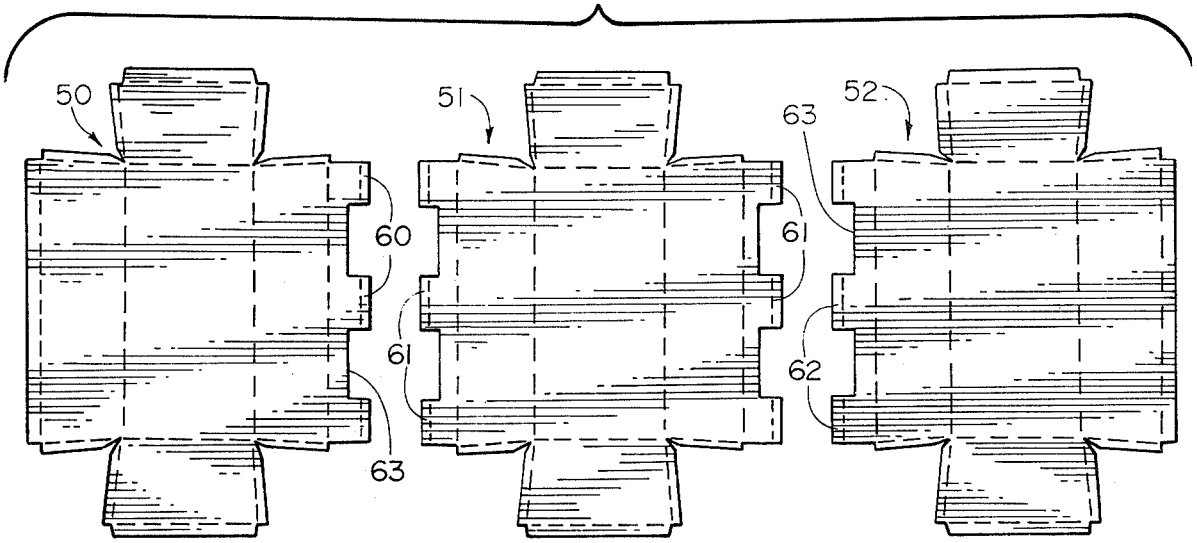
FIG. 14 is a plan view of three sheet metal blanks for production of baking pans to be joined together in a pan set in accordance with this invention, while said blanks are in a flat state.

Referring now to FIG. 14, there are shown three blanks of sheet metal for producing baking pans to be formed in accordance with this invention and joined together as a pan set in a manner to be described. As shown, the blanks 50, 51 and 52 are similar to the blank 8 of FIG. 1 and have fold lines indicated by dotted lines for bending and forming said blanks into pan shapes as heretofore described. Thus, while each blank 50, 51 and 52 will be folded to provide abutting side wall corner flanges which will be fused and reformed to provide corner posts connecting the pan side walls, there are additional means provided for permitting securement of such formed pans in a side-by-side relationship. Such additional means for pan blank 50 is the flange 60, for pan blank 51 are the flanges 61, and for the pan blank 52 is the flange 62.

Figure 15:
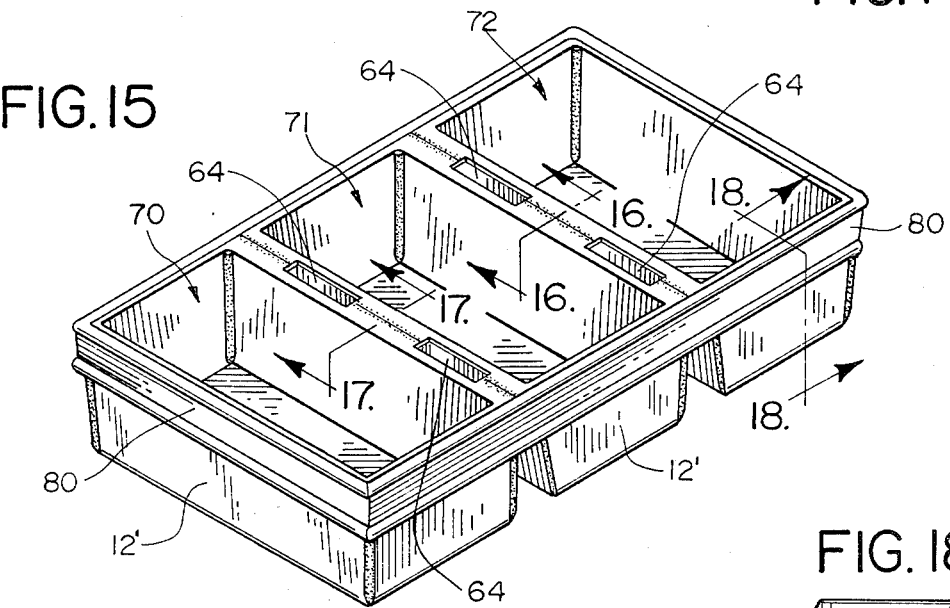
FIG. 15 is a perspective view of a pan set that has been formed from the blanks illustrated in FIG. 14 and assembled in accordance with this invention.
Figure 16:
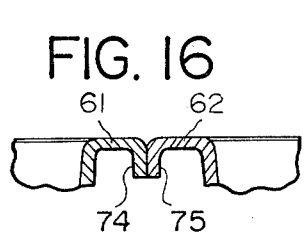
FIG. 16 is an enlarged sectional view taken along lines 16—16 of FIG. 15.
Figure 17:
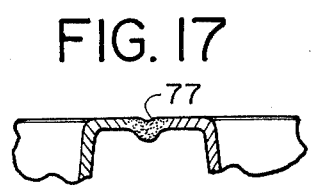
FIG. 17 is an enlarged sectional view taken along lines 17—17 of FIG. 15.
Figure 18:
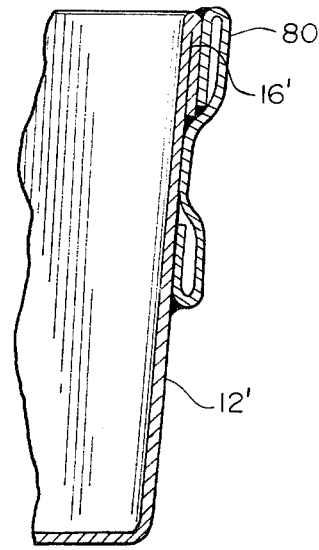
FIG. 18 is an enlarged sectional view taken along lines 18—18 of FIG. 15.

As shown in FIG. 15, pans 70, 71 and 72 formed from blanks 50, 51 and 52, respectively, are placed in a side-by-side relationship so that flanges 60, and 61 are adjacent each other, and flanges 61 and 62 are adjacent each other. As shown in FIG. 16, the terminal portions 74 and 75 of flanges 61 and 62, respectively, are formed at right angles to said flanges to be disposed in an abutting position. A laser device is directed at the abutting terminal portions, in a similar manner as previously described, for the purpose of fusing said terminal portions together, such fusion being shown by reference to FIG. 17 and as indicated by reference numeral 77. Such fusions of flange terminal portions interconnect the pans in side-by-side relationship and cooperate with a strapping band 80 disposed to encompass the pans to provide a pan set assembly. As shown in FIG. 18 the strapping band 80 is secured by spot welds 81 to the pan side wall 12' and the side wall top flange 16'.

With reference to FIGS. 14 and 15, it should be noted that flanges 60, 61 and 62 are formed to provide cut-outs 63 which cooperate in assembled condition to form openings 64. Such openings not only reduce the overall weight of the assembled pan set but provide for heat circulation during baking as well as liquid circulation during pan cleaning operations.

Figure 19:
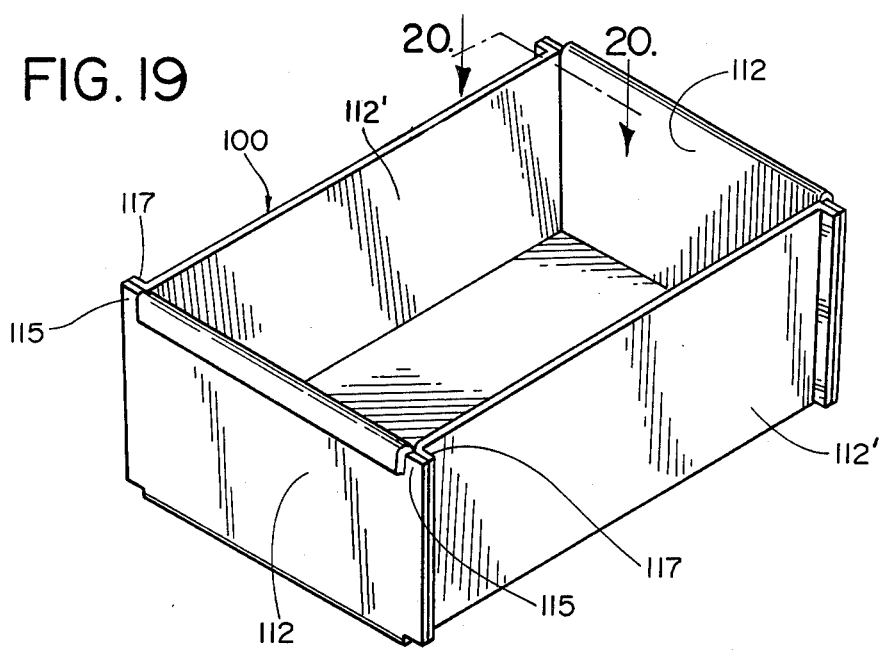
FIG. 19 is a perspective view of a baking pan of modified construction.
Figure 20:
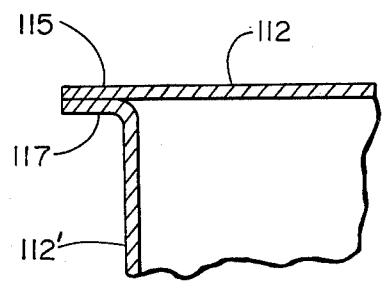
FIG. 20 is an enlarged sectional view taken along lines 20—20 of FIG. 19.

Referring now to FIG. 19 there is shown a baking pan of modified construction. As shown, the baking pan 100 is formed to produce a flat bottom wall 111 and side walls 112 and 112' extending upwardly therefrom, said side walls 112 and 112' having corner flange portions 115 and 117, respectively, formed at the lateral terminal portions thereof. Corner flange 115 lies in the same plane as side wall 112 of which it is an extension, whereas corner flange 117 extends outwardly from side wall 112' at approximately a right angle thereto. As shown in FIG. 19, and with reference to FIG. 20, when the side walls 112 and 112' are positioned in a plane substantially normal to the bottom wall 111, the adjacent corner flanges 115 and 117 are in abutment one with the other.

Figure 21:
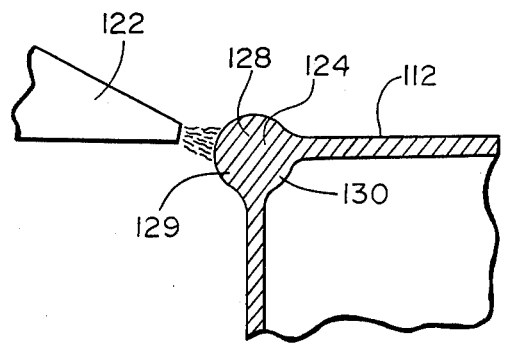
FIG. 21 is a sectional view similar to FIG. 20 showing means for fusing adjacent side walls.

For the purpose of now fusing and reforming the adjacent corner flanges to permanently connect the adjacent side walls it is necessary that intimate contact between the abutting flanges be maintained. Any suitable holding device (not shown) may be utilized which will secure the pan in the condition illustrated in FIG. 19 to permit relative movement between the pan and a device for fusing the abutting corner flanges 115 and 117. Such a fusing device may be a laser gun as indicated by reference numeral 122 in FIG. 21.

As previously described the laser gun having certain characteristics and being used under certain conditions will fuse the abutting corner flanges to produce a corner connection between adjacent side walls. The corner connection 124 is generally circular in cross-section and substantially thicker than the side walls.

Figure 22:
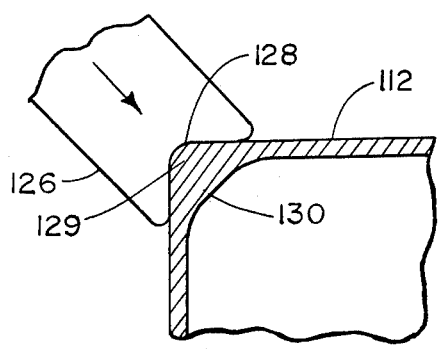
FIG. 22 is a sectional view similar to FIG. 21 but showing means for reforming the fused connection between the side walls.

As shown in FIG. 22 a reforming device 126 applies pressure to the outer surface 128 of the corner connection to reform said corner connection into a corner post 129. Such reformation of the corner connection upsets the material mass in a manner so that the outer surface 128 and the inner surface 130 of the resulting corner post 129 provide smooth, uniform surfaces which blend into the adjacent side walls. Such reforming of the corner connection 124 disposes the outer surface 128 of the resulting corner post within the planes of the outer surfaces of the adjacent side walls.

As previously described a baking pan produced in accordance with this invention has corner posts substantially thicker than the side walls thereby providing corner strength in excess of side wall strength, such pan corner strength being achieved without losing the savings in material costs and baking efficiencies occasioned by relatively thin pan wall construction. It is important, and within the teachings of this invention, that a columnar mass of material of substantial thickness is formed at and confined to the point of intersection of the side walls, and that such construction provides smooth, uniform surfaces on the inner and outer pan wall surfaces.

It is believed that the invention and many of its attendant advantages will be understood from the foregoing description but it should be apparent that various changes may be made in the form, construction and arrangement of parts without departing from the spirit and scope of the invention or sacrificing all of its material advantages, the form hereinbefore described being merely a preferred embodiment thereof.

I claim:

1. A method for forming a baking pan from a single blank of sheet metal of uniform thickness, comprising bending said blank along predetermined score lines to provide a bottom wall of rectangular plan and side walls extending upwardly from said bottom wall, said side walls having flanges formed at the terminal portions thereof, holding the adjacent flanges of adjacent side walls in abutting relationship, applying a localized high heat to the abutting adjacent flanges of the side walls thereby fusing said flanges to form a corner connection between adjacent side walls, applying pressure to the corner connection thereby reforming said corner connection to provide a corner post the outer surface of which lies within the point of intersection of the outer surfaces of said adjacent side walls.

2. A method for forming a baking pan according to claim 1 wherein the side wall flanges extend outwardly and the fusing of said flanges forms a corner connection which extends outwardly from the side walls.

3. A method for forming a baking pan according to claim 2 wherein the side wall flanges are disposed in a plane approximately 45° from the plane of said side walls.

4. A method for forming a baking pan according to claim 1 wherein the fusing of the side wall flanges forms a corner connection being substantially thicker than the side walls whereby the reforming of said corner connection provides a corner post substantially thicker than said side walls.

5. A method for forming a baking pan according to claim 4 wherein the reforming of the corner connection provides a corner post having an elliptical cross-section configuration.

* * * * *